US012530225B2

(12) United States Patent
Xue et al.

(10) Patent No.: US 12,530,225 B2
(45) Date of Patent: Jan. 20, 2026

(54) UTILIZING HIDDEN STATE SHARING MODULES TO PREVENT CATASTROPHIC FORGETTING

(71) Applicant: International Business Machines Corporation, Armonk, NY (US)

(72) Inventors: Qinghan Xue, Sunnyvale, CA (US); Xiaolong Wang, Campbell, CA (US); Steven Nicholas Eliuk, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 17/473,808

(22) Filed: Sep. 13, 2021

(65) Prior Publication Data

US 2023/0085043 A1 Mar. 16, 2023

(51) Int. Cl.
*G06F 9/48* (2006.01)
*G06N 3/04* (2023.01)
*G06N 3/0442* (2023.01)
*G06N 3/096* (2023.01)

(52) U.S. Cl.
CPC .............. *G06F 9/4881* (2013.01); *G06N 3/04* (2013.01); *G06N 3/0442* (2023.01); *G06N 3/096* (2023.01)

(58) Field of Classification Search
CPC ......... G06N 3/04; G06N 3/0442; G06N 3/044
See application file for complete search history.

(56) References Cited

U.S. PATENT DOCUMENTS 10,346,351 B2  7/2019  Henry et al.
10,810,482 B2  10/2020  Kim et al.
(Continued)

FOREIGN PATENT DOCUMENTS

CN  105513591 A   4/2016
CN  108694480 A  10/2018
CN  109559332 A   4/2019
(Continued)

OTHER PUBLICATIONS

Swaroop, Siddharth, et al. "Improving and understanding variational continual learning." arXiv preprint arXiv:1905.02099 (2019) (Year: 2019).*

(Continued)

*Primary Examiner* — Schyler S Sanks
(74) *Attorney, Agent, or Firm* — Shackelford, Mckinley & Norton, LLP; Robert A. Voigt, Jr.

(57) ABSTRACT

A computer-implemented method, system and computer program product for processing data. Data, including single data points (e.g., images) or entire sequences of data (e.g., speech, video), is received to be processed. A long short term memory structure is utilized to process the received data, where the long short term memory structure includes hidden state sharing modules for allowing information sharing in hidden states across different tasks. The hidden state sharing modules include broadcast modules which are configured to send hidden states of the current task to all previous modules and collect modules which are configured to collect all the hidden states from all the previous modules. In this manner, catastrophic forgetting is avoided by preventing the loss of previously learned information via the use of hidden state sharing modules.

20 Claims, 7 Drawing Sheets

(56) References Cited

U.S. PATENT DOCUMENTS

2019/0325514 A1 10/2019 Hong
2020/0117854 A1 4/2020 Lu et al.

FOREIGN PATENT DOCUMENTS

CN 109931678 A 6/2019
CN 105513591 B 9/2019

OTHER PUBLICATIONS

Qiaolin Xia, Lei Sha, Baobao Chang, and Zhifang Sui. 2017. A Progressive Learning Approach to Chinese SRL Using Heterogeneous Data. In Proceedings of the 55th Annual Meeting of the Association for Computational Linguistics (vol. 1: Long Papers), pp. 2069-2077 (Year: 2017).*

Guo et al., "Continual Learning Long Short Term Memory," Conference on Empirical Methods in Natural Language Processing, Nov. 16-20, 2020, pp. 1817-1822, Grace Period Disclosure.

Guo, et al., Supplementary Material for Continual Learning Long Short Term Memory, Retrieved from: chrome-extension://efaidnbmnnnibpcajpcglclefindmkaj/https://aclanthology.org/attachements/2020.findings-emnlp.164.OptionalSupplementaryMaterial.pdf, 2020, 2 pages.

* cited by examiner

UTILIZING HIDDEN STATE SHARING MODULES TO PREVENT CATASTROPHIC FORGETTING

STATEMENT REGARDING PRIOR DISCLOSURES BY THE INVENTOR OR JOINT INVENTOR

The following disclosure(s) are submitted under 35 U.S.C. 102(b)(1)(A):
GUO et al., "Continual Learning Long Short Term Memory," Conference on Empirical Methods in Natural Language Processing, Nov. 16-20, 2020, pp. 1817-1822.

TECHNICAL FIELD

The present disclosure relates generally to artificial neural networks, and more particularly to utilizing hidden state sharing modules in a long short term memory structure to prevent catastrophic forgetting.

BACKGROUND

Artificial neural networks are computing systems inspired by the biological neural networks that constitute animal brains. An artificial neural network is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer) to the last layer (the output layer), possibly after traversing the layers multiple times.

SUMMARY

In one embodiment of the present disclosure, a computer-implemented method for processing data comprises receiving data. The method further comprises processing the received data by utilizing a long short term memory structure, where the long short term memory structure comprises hidden state sharing modules for allowing information sharing in hidden states across different tasks.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
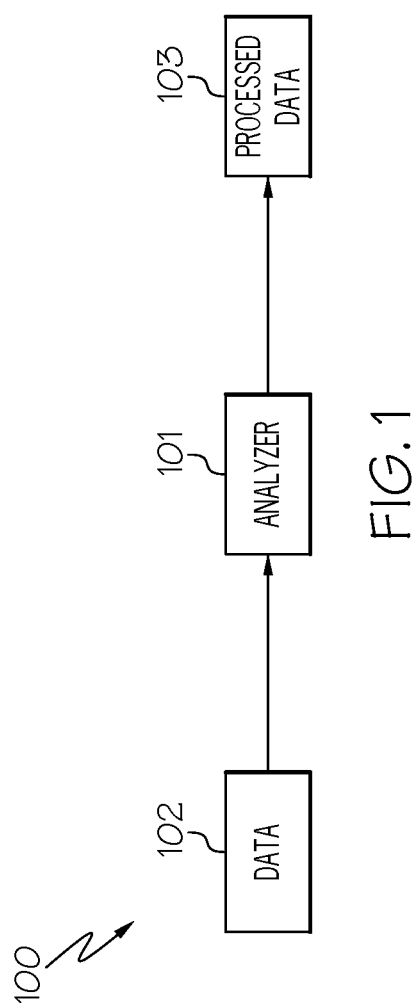
FIG. 1 illustrates an embodiment of the present disclosure of a communication system for processing data using an artificial neural network while preventing catastrophic forgetting.

As stated in the Background section, artificial neural networks are computing systems inspired by the biological neural networks that constitute animal brains. An artificial neural network is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer) to the last layer (the output layer), possibly after traversing the layers multiple times.

There are various types of artificial neural networks, such as modular neural networks, radial basis function neural networks, Kohonen neural networks, recurrent neural networks, convolutional neural networks, long short term memory networks, etc.

Such artificial neural networks, such as long short term memory networks, may attempt to engage in "continual learning." Continual learning is the idea of learning continuously and adaptively about the external world and enabling the autonomous incremental development of ever more complex skills and knowledge. In the context of machine learning, it means being able to continuously learn from new tasks while still being able to re-use and retain useful knowledge and skills learned from old tasks.

Unfortunately, when such artificial neural networks attempt to learn new tasks, old tasks may be forgotten. Such a phenomenon is known as "catastrophic forgetting."

Catastrophic forgetting is the tendency of the artificial neural network to completely and abruptly forget previously learned information upon learning new information. Specifically, these problems refer to the challenge of making an artificial neural network that is sensitive to, but not disrupted by, new information.

Attempts have been made to address catastrophic forgetting, such as using expandable networks to learn and store old and new knowledge and then acquiring a task identifier to identify the task to be associated with the storage of old or new knowledge during the "inference stage" (stage in which the model is used to infer or predict).

Unfortunately, the requirement of acquiring a task identifier during the inference stage is infeasible and impractical in real-world scenarios due to time constraints and the number of task identifiers that need to be generated.

The embodiments of the present disclosure provide a means for preventing catastrophic forgetting without requiring task identifiers to be acquired during the inference stage by utilizing hidden state sharing modules in a long short term memory structure.

In some embodiments of the present disclosure, the present disclosure comprises a computer-implemented method, system and computer program product for processing data. In one embodiment of the present disclosure, data, including single data points (e.g., images) or entire sequences of data (e.g., speech, video), is received to be processed (e.g., classified, used to make predictions, etc.). A long short term memory structure is utilized to process the received data, where the long short term memory structure includes hidden state sharing modules for allowing information sharing in hidden states across different tasks. In one embodiment, the hidden state sharing modules include broadcast modules which are configured to send hidden states of the current task to all previous modules and collect modules which are configured to collect all the hidden states from all the previous modules. In this manner, by broadcasting the hidden states to all the previous modules as well as collecting the hidden states from all the previous modules, information learned from old tasks are not forgotten as the artificial neural network attempts to learn new tasks. That is, catastrophic forgetting is avoided by preventing the loss of previously learned information via the use of hidden state sharing modules. Furthermore, by using such hidden state sharing modules, the requirement of acquiring a task identifier during the inference stage is avoided.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for processing data (e.g., sequential data) using an artificial neural network, such as a long short term memory network, while preventing catastrophic forgetting. As shown in FIG. 1, communication system 100 includes an analyzer 101 configured to process (e.g., classify, make predictions) data 102 by utilizing a long short term memory network (discussed further below) in order to generate processed data 103, such as classified or predicted data.

In one embodiment, data 102 includes single data points (e.g., images) or entire sequences of data (sequential data) (e.g., speech, video). Such data may be processed by analyzer 101 using a long short term memory network (discussed further below) to engage in continual learning, such as solving prediction problems (e.g., predicting sales, finding patterns in stock markets' data, understanding movie plots, recognizing a person's way of speech, language translations, predicting a person's next word on a keyboard, etc.). Such outputted data 103 may then be presented to a user, such as via a user interface of analyzer 101.

In one embodiment, analyzer 101 performs such operations while preventing catastrophic forgetting by utilizing hidden state sharing modules in the long short term memory structure as discussed further below.

A description of the software components of analyzer 101 used to process data while preventing catastrophic forgetting by utilizing hidden state sharing modules in the long short term memory structure is provided below in connection with FIG. 2. A description of the hardware configuration of analyzer 101 is provided further below in connection with FIG. 5.

Figure 2:
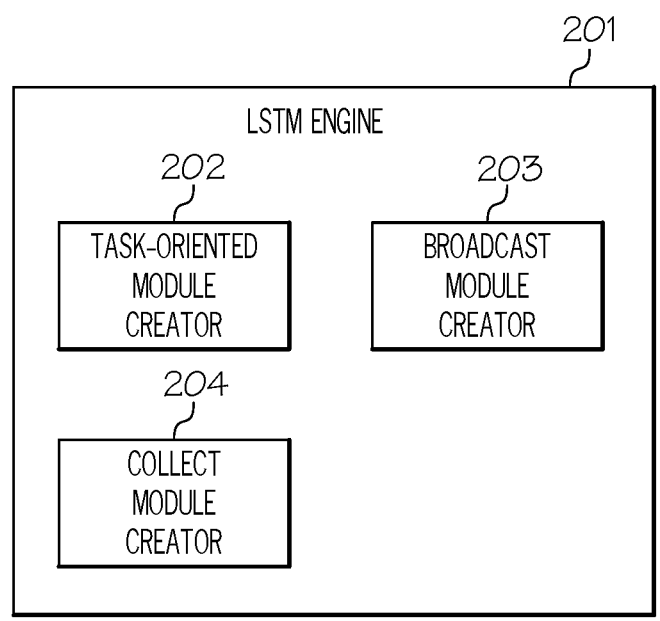
FIG. 2 is a diagram of the software components used by the analyzer to process data while preventing catastrophic forgetting by utilizing hidden state sharing modules in the long short term memory (LSTM) structure in accordance with an embodiment of the present disclosure.

As stated above, FIG. 2 is a diagram of the software components used by analyzer 101 (FIG. 1) to process data (e.g., classify, make predictions) while preventing catastrophic forgetting by utilizing hidden state sharing modules in the long short term memory structure in accordance with an embodiment of the present disclosure.

Referring now to FIG. 2, in conjunction with FIG. 1, analyzer 101 includes a long short term memory (LSTM) engine 201 configured to process data 102 (e.g., sequential data). "Processing" of data 102 by LSTM engine 201, as used herein, refers to classifying, converting, manipulating and managing data 102 as well as making predictions using the received data 102.

In one embodiment, LSTM engine 201 is configured to establish a LSTM network. In one embodiment, the LSTM network utilizes an LSTM structure that includes separate modules for different tasks. One such module is referred to herein as the "task-oriented" module. The other types of modules utilized in the LSTM structure are referred to herein as the "hidden state sharing modules." A further description of these modules is provided below in connection with FIG. 3.

Figure 3:
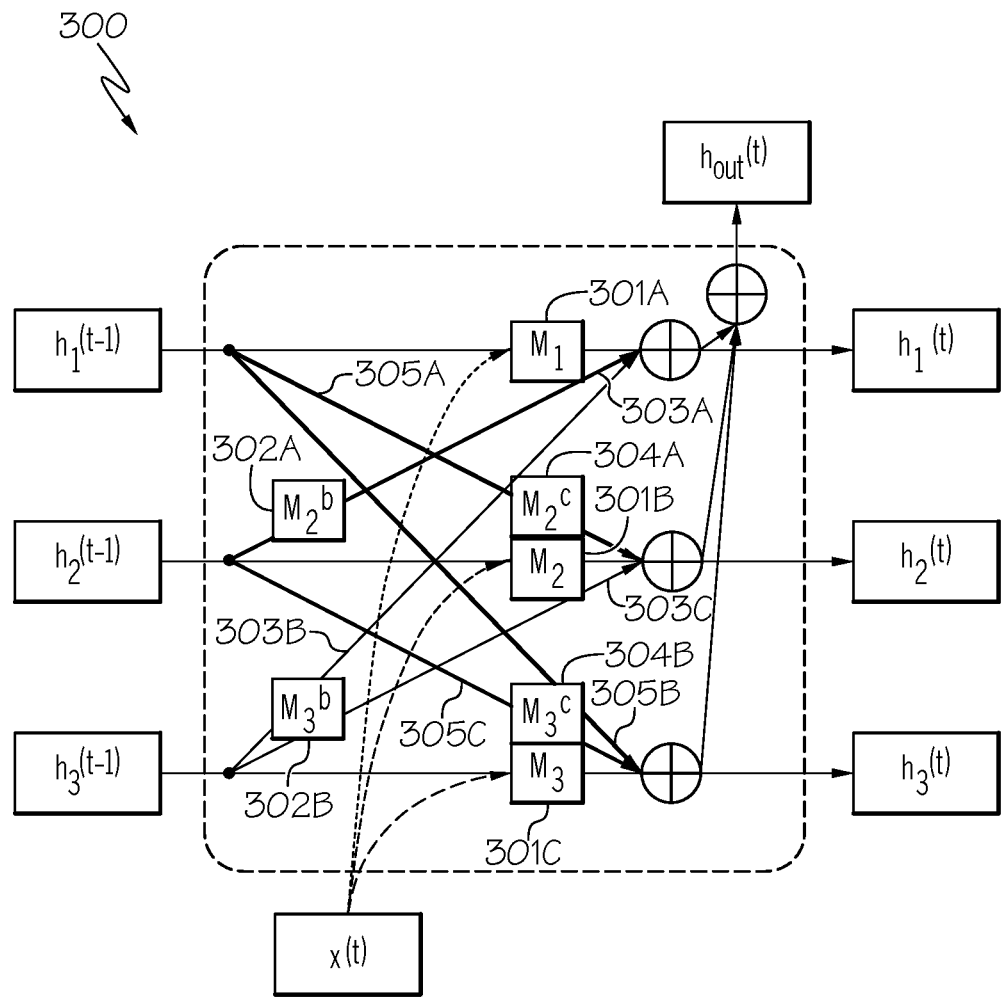
FIG. 3 illustrates an LSTM structure for processing tasks while preventing catastrophic forgetting in accordance with an embodiment of the present disclosure.

FIG. 3 illustrates an LSTM structure for processing tasks while preventing catastrophic forgetting in accordance with an embodiment of the present disclosure.

Referring to FIG. 3, in conjunction with FIG. 2, LSTM structure 300 includes task-oriented modules 301A-301C (identified as modules $M_1$, $M_2$ and $M_3$, respectively, in FIG. 3) for controlling information flow. Task-oriented modules 301A-301C may collectively or individually be referred to as task-oriented modules 301 or task-oriented module 301, respectively. While FIG. 3 illustrates three task-oriented modules 301 for controlling information flow for three tasks, LSTM structure 300 may include any number of task-oriented modules 301 for controlling information flow for the same number of tasks.

In one embodiment, task-oriented module 301 includes computational blocks that control information flow. For example, in one embodiment, task-oriented module 301 includes a cell, an input gate, an output gate and a forget gate. The cell remembers values over arbitrary time intervals and the three gates regulate the flow of information into and out of the cell. An illustration of an embodiment of task-oriented module 301 is shown in FIG. 4 in accordance with an embodiment of the present disclosure.

Figure 4:
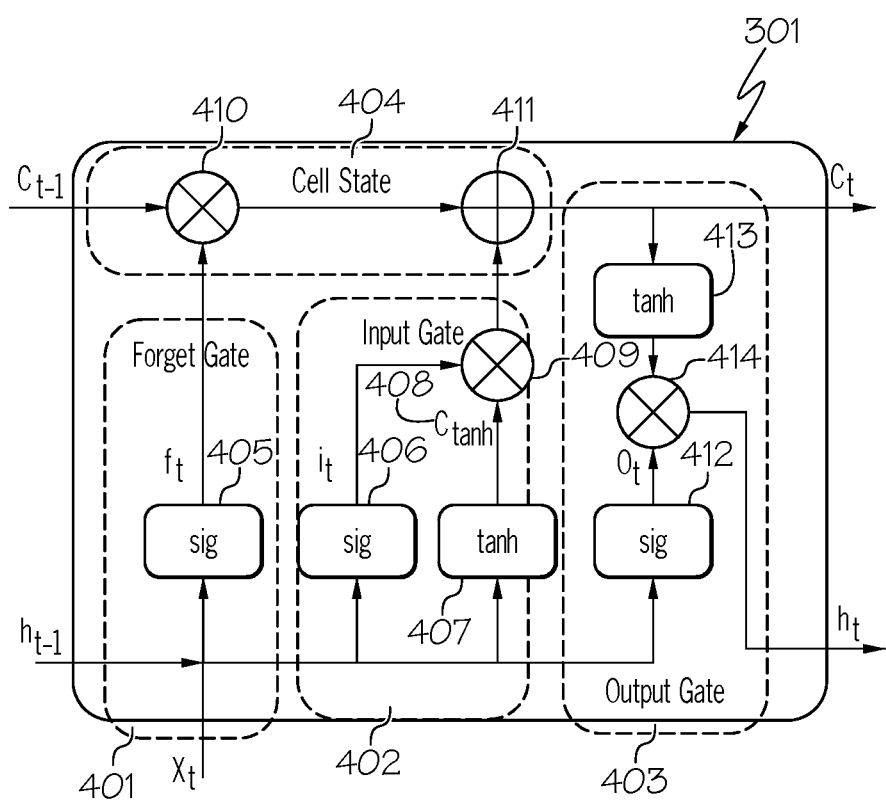
FIG. 4 illustrates an embodiment of a task-oriented module in accordance with an embodiment of the present disclosure.

Referring to FIG. 4, in conjunction with FIG. 3, task-oriented module 301 includes a forget gate 401, an input gate 402, an output gate 403 and a cell state 404. Forget gate 401 decides which information needs attention and which can be ignored. The information from the current input $x_t$ and hidden state $h_{t-1}$ are passed through the sigmoid function (abbreviated as "sig") 405. Sigmoid 405 generates values between 0 and 1. It concludes whether the part of the old output is necessary (by giving the output closer to 1). This value of $f_t$ will later be used by the cell for point-by-point multiplication.

In one embodiment, input gate 402 performs the following operations to update the cell status. First, the current state $x_t$ and previously hidden state $h_{t-1}$ are passed into the second sigmoid function 406 forming input vector $i_t$. The values are transformed between 0 (important) and 1 (not-important). Next, the same information of the hidden state and current state will be passed through the tanh function 407. To regulate the network, the tanh operator 407 will create a vector $C_{tanh}$ 408 with all the possible values between −1 and 1. The output values generated from the activation functions are ready for point-by-point multiplication by multiplier 409.

In one embodiment, concerning cell state 404, the network has enough information from forget gate 401 and input gate 402. The next step is to decide and store the information from the new state in cell state 404. The previous cell state $C_{t-1}$ gets multiplied with forget vector $f_t$ by multiplier 410. If the outcome is 0, then values will get dropped in cell state 404. Next, the network takes the output value of the input vector $i_t$ and performs point-by-point addition by adder 411, which updates the cell state giving the network a new cell state $C_t$.

In one embodiment, output gate 403 determines the value of the next hidden state. This state contains information on previous inputs. First, the values of the current state and previous hidden state are passed into the third sigmoid function 412 (output is $O_t$). Then the new cell state generated from the cell state is passed through the tanh function 413. Both these outputs are multiplied point-by-point by multiplier 414. Based upon the final value, the network decides which information the hidden state ($h_t$) should carry. This hidden state is used for prediction. Finally, the new cell state and new hidden state are carried over to the next time step.

Hence, in one embodiment, forget gate 401 determines which relevant information from the prior steps is needed. Input gate 402 decides what relevant information can be added from the current step, and output gate 403 finalize the next hidden state.

Returning to FIG. 2, in conjunction with FIGS. 1 and 2-4, LSTM engine 201 includes a task-oriented module creator 202 configured to create task-oriented modules 301, which were described above.

Furthermore, LSTM engine 201 includes modules for creating the hidden state sharing modules. In one embodiment, LSTM engine 201 includes a broadcast module creator 203 configured to create broadcast modules 302A-302B (shown in FIG. 3 as $M_2^b$ and $M_3^b$, respectively). Broadcast modules 302A-302B may collectively or individually be referred to as broadcast modules 302 or broadcast module 302, respectively. Broadcast modules 302 are configured to send hidden states of the current task (k) to all the previous (<k) modules, such as shown in FIG. 3, via arrows 303A-303C. For example, as shown in FIG. 3, module $M_2^b$ 302 A is created by broadcast module creator 203, which broadcasts or sends the hidden states of the current task (k) to all the previous modules, such as module 301A, via path 303A. In another example, as shown in FIG. 3, module $M_3^b$ 302 B is created by broadcast module creator 203, which broadcasts or sends the hidden states of the current task (k) to all the previous modules, such as modules 301A-301B, 302A and 304A (discussed further below), via paths 303B and 303C as shown in FIG. 3. While FIG. 3 illustrates two created broadcast modules 302 for three tasks, any number of broadcast modules 302 may be created by broadcast module creator 203 that equals the number of tasks to be processed by LSTM architecture 300-1.

Furthermore, LSTM engine 201 includes collect module creator 204 configured to create collect modules 304A-304B (shown in FIG. 3 as $M_2^c$ and $M_3^c$, respectively). Collect modules 304A-304B may collectively or individually be referred to as collect modules 304 or collect module 304, respectively. Collect modules 304 are configured to collect all the hidden states from all the previous modules, such as shown in FIG. 3, via arrows 305A-305C. For example, as shown in FIG. 3, module $M_2^c$ 304 A is created by collect module creator 204, which collects all the hidden states from all the previous modules, such as module 301A, via path 305A. In another example, as shown in FIG. 3, module $M_3^c$ 304B is created by collect module creator 204, which collects all the hidden states from all the previous modules, such as modules 301A-301B, 302A and 304A, via paths 305B and 305C as shown in FIG. 3. While FIG. 3 illustrates two created collect modules 304 for three tasks, any number of collect modules 304 may be created by collect module creator 204 that equals the number of tasks to be processed by LSTM architecture 300-1.

A further description of these and other functions is provided below in connection with FIGS. 1-4.

In one embodiment, the LSTM operates as a parameterized function R that task an input vector $x_t$ with a state vector $(c_{t-1}, h_{t-1})$ and returns a state vector $(c_t, h_t)=R(x_t, c_{t-1}, h_{t-1})$. Specifically, it incorporates a gating mechanism, taking the form:

$$f_t = W^f x_t + U^f h_{t-1} + b^f, \quad (1)$$

$$i_t = W^i x_t + U^i h_{t-1} + b^i, \quad (2)$$

$$o_t = W^o x_t + h_{t-1} + b^o, \quad (3)$$

$$\tilde{c}_t = W^c x_t + U^c h_{t-1} + b^c, \quad (4)$$

where Ws and Us are learnable matrices, and bs are biases. By integrating Ws and Us into one single matrix W and combining the bs into b, then by concatenating $x_t$ and $h_{t-1}$, the result is:

$$[f_t, i_t, o_t, \tilde{c}_t] = W[x_t, h_{t-1}] + b. \quad (5)$$

The outputs $c_t$ and $h_t$ can be obtained from:

$$c_t = \sigma(f_t) \circ c_{t-1} + \sigma(i_t) \circ \tanh(\tilde{c}_t), \quad (6)$$

$$h_t = \sigma(o_t) \circ g(c_t), \quad (7)$$

where σ indicates the sigmoid function, ∘ represents the Hadamard product, g can be either tanh or the identity function. For a standard LSTM cell with parameters {W, b} (matrix and bias) included within one module, M, the update of $h_t$ can be represented as:

$$h_t = M(x_t, h_{t-1}) \quad (8)$$

In one embodiment, the model parameters {W, b} in the LSTM structure keep updating once the given structure starts to learn the new task, which makes it difficult to avoid catastrophic forgetting. To mitigate this phenomena, LSTM structure 300 of FIG. 3 is utilized, which is comprised of task-oriented modules 301 and hidden state sharing modules 302, 304.

With respect to task-oriented modules 301, assuming that the model is going to learn K tasks sequentially, the training data is X={$X_1, \ldots, X_k \ldots X_K$}, where $X_k$ denotes the training data set for the kth task. There are $C_k$ different classes included in task k. When the first task comes, LSTM structure 300 starts with a single module $M_1$={$W_1, b_1$}. $M_1$ is updated like a standard LSTM with the training data $x \in X_1$:

$$h^{(t)} = M_1(x^{(t)}, h^{(t-1)}), t \in \{1, 2, \ldots, T\}, \qquad (9)$$

where $h_1^{(t)}$ is the hidden state at timestamp t, T represents the length of sequential data x, and $c_1^{(t)}$ is updated by Eq. 6. When LSTM structure 300 starts to process (work) a new task k>1, parameters of old tasks ($M<_k$) are frozen (immobilized) and a new module $M_k$={$W_k, b_k$} is created. This design allows the model to keep old information in an expandable way.

With respect to hidden state sharing modules, a communication mechanism of LSTM structure 300 allows the information sharing in hidden states across different tasks. Specifically, when it goes to task k>1, a broadcast module 302 ($M_k^b$)={$W_k^b, b_k^b$} is created to send hidden states of task k to all previous (<k) modules. On the reverse information flow, a collect module 304 ($M_k^c$)={$W_k^c, b_k^c$} is created for task k to collect all hidden states from all previous modules. For any $1 \leq j \leq k$, the hidden states of module j are updated by:

$$h_j^{(t)} = M_j(x^t, h_j^{(t-1)}) + \sum_{1 \leq i < j} M_j^c(h_i^{(t-1)}) + \sum_{j \leq i < k} M_i^b(h_i^{(t-1)}), t \in \{1, 2, \ldots, T\}, \qquad (10)$$

where $h_j^{(t)}$ is the updated hidden state of module j with additional information sharing. It is noted that at task k, $M_j^{(\cdot)}$ is frozen for all j<k. The intuition of broadcast module 302 and collect module 304 is: when learning a new task k, $M_k^c$ can learn how to aggregate weighted previous knowledge to accelerate and improve the knowledge learning of task k. And via $M_k^b$, the knowledge of task k can be broadcasted to previous modules thereby facilitating the task separations as well as enhancing the performance of old tasks.

At the $k^{th}$ task, there are k hidden states at timestamp t: $h_i^{(t)}$, i, $\in \{1, 2, \ldots, k\}$. To avoid using the task identifier to select different modules for different tasks during inference, embodiments of the present disclosure feed the input data to all modules and aggregate the knowledge from $\forall k \leq K$ tasks. As a result, the output hidden state $h_{out_k}^{(t)}$ is obtained by:

$$h_{out_k}^{(t)} = h_1^{(t)} + h_2^{(t)} + \ldots + h_k^{(t)} \qquad (11)$$

As a result, the output hidden state is the summation of all modules' hidden states.

A further description of these and other functions is provided below in connection with the discussion of the method for processing data using an LSTM structure which prevents catastrophic forgetting by utilizing hidden state sharing modules.

Prior to the discussion of the method for processing data using an LSTM structure which prevents catastrophic forgetting by utilizing hidden state sharing modules, a description of the hardware configuration of analyzer 101 (FIG. 1) is provided below in connection with FIG. 5.

Figure 5:
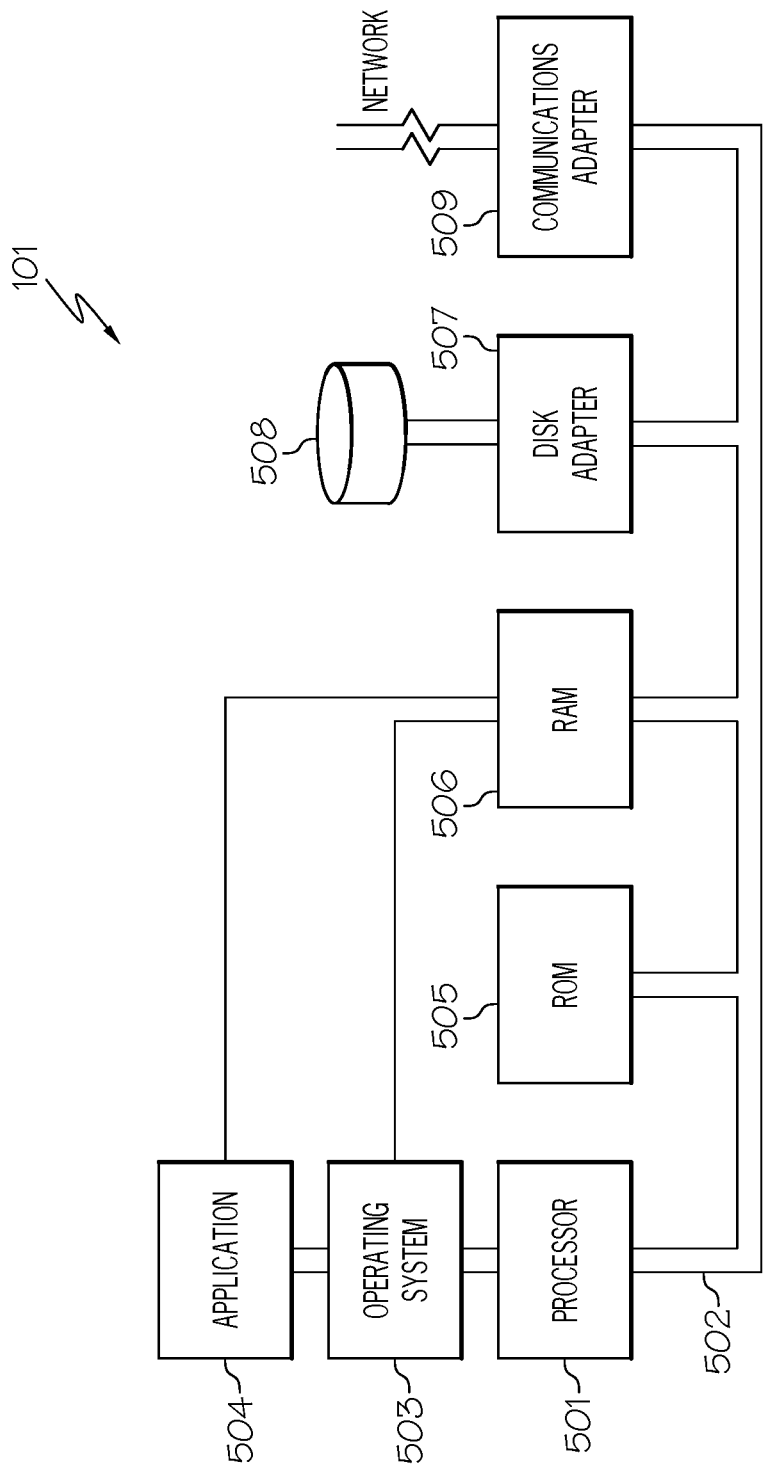
FIG. 5 illustrates an embodiment of the present disclosure of the hardware configuration of the analyzer which is representative of a hardware environment for practicing the present disclosure.

Referring now to FIG. 5, FIG. 5 illustrates an embodiment of the present disclosure of the hardware configuration of analyzer 101 (FIG. 1) which is representative of a hardware environment for practicing the present disclosure.

Analyzer 101 has a processor 501 connected to various other components by system bus 502. An operating system 503 runs on processor 501 and provides control and coordinates the functions of the various components of FIG. 5. An application 504 in accordance with the principles of the present disclosure runs in conjunction with operating system 503 and provides calls to operating system 503 where the calls implement the various functions or services to be performed by application 504. Application 504 may include, for example, LSTM engine 201 (FIG. 2). Furthermore, application 504 may include, for example, a program for processing data using an LSTM structure which prevents catastrophic forgetting by utilizing hidden state sharing modules as discussed further below in connection with FIGS. 6 and 7.

Referring again to FIG. 5, read-only memory ("ROM") 505 is connected to system bus 502 and includes a basic input/output system ("BIOS") that controls certain basic functions of analyzer 101. Random access memory ("RAM") 506 and disk adapter 507 are also connected to system bus 502. It should be noted that software components including operating system 503 and application 504 may be loaded into RAM 506, which may be analyzer's 101 main memory for execution. Disk adapter 507 may be an integrated drive electronics ("IDE") adapter that communicates with a disk unit 508, e.g., disk drive. It is noted that the program for processing data using an LSTM structure which prevents catastrophic forgetting by utilizing hidden state sharing modules, as discussed further below in connection with FIGS. 6 and 7, may reside in disk unit 508 or in application 504.

Analyzer 101 may further include a communications adapter 509 connected to bus 502. Communications adapter 509 interconnects bus 502 with an outside network (now shown in FIG. 1) to communicate with other devices.

In one embodiment, application 504 of analyzer 101 includes the software component of LSTM engine 201. In one embodiment, such a component may be implemented in hardware, where such a hardware component would be connected to bus 502. The functions discussed above performed by such a component are not generic computer functions. As a result, analyzer 101 is a particular machine that is the result of implementing specific, non-generic computer functions.

In one embodiment, the functionality of such software components (e.g., LSTM engine 201) of analyzer 101, including the functionality for processing data using an LSTM structure which prevents catastrophic forgetting by utilizing hidden state sharing modules, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, there are various types of artificial neural networks, such as modular neural networks, radial basis function neural networks, Kohonen neural networks, recurrent neural networks, convolutional neural networks, long short term memory networks, etc. Such artificial neural networks, such as long short term memory networks, may attempt to engage in "continual learning." Continual learning is the idea of learning continuously and adaptively about the external world and enabling the autonomous incremental development of ever more complex skills and knowledge. In the context of machine learning, it means being able to continuously learn from new tasks while still being able to re-use and retain useful knowledge and skills learned from old tasks. Unfortunately, when such artificial neural networks attempt to learn new tasks, old tasks may be forgotten. Such a phenomenon is known as "catastrophic forgetting." Catastrophic forgetting is the tendency of the artificial neural network to completely and abruptly forget previously learned information upon learning new information. Specifically, these problems refer to the challenge of making an artificial neural network that is sensitive to, but not disrupted by, new information. Attempts have been made to address catastrophic forgetting, such as using expandable networks to learn and store old and new knowledge and then acquiring a task identifier to identify the task to be associated with the storage of old or new knowledge during the "inference stage" (stage in which the model is used to infer or predict). Unfortunately, the requirement of acquiring a task identifier during the inference stage is infeasible and impractical in real-world scenarios due to time constraints and the number of task identifiers that need to be generated.

Figure 6:
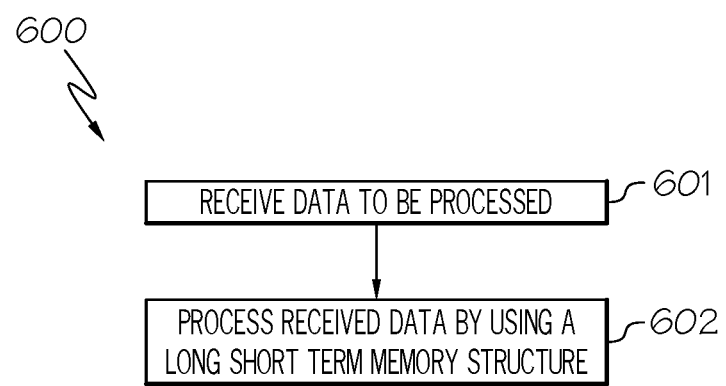
FIG. 6 is a flowchart of a method for processing data using an LSTM structure in accordance with an embodiment of the present disclosure.
Figure 7:
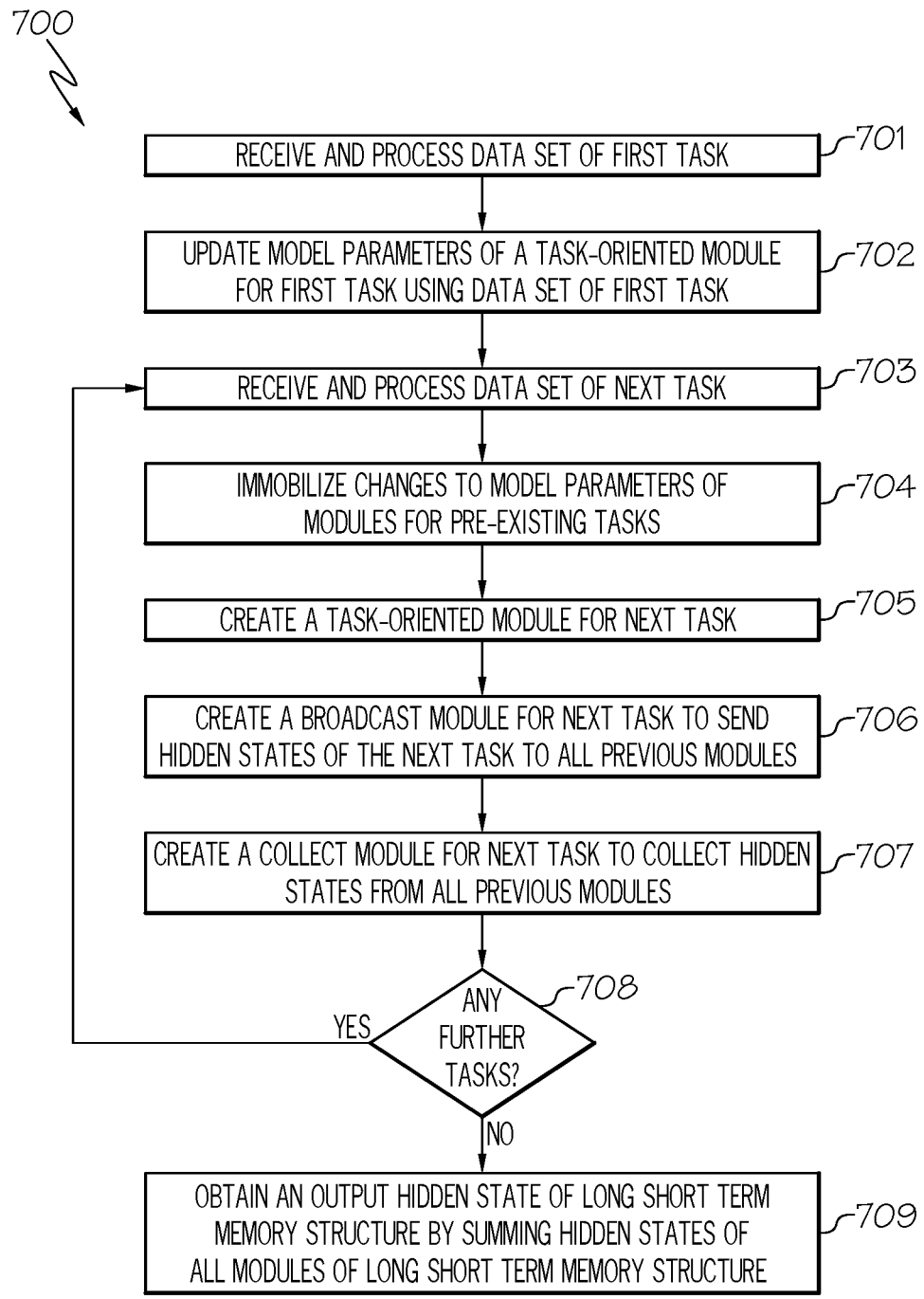
FIG. 7 is a flowchart of a method for preventing catastrophic forgetting by the LSTM structure utilizing hidden state sharing modules in accordance with an embodiment of the present disclosure.

The embodiments of the present disclosure provide a means for preventing catastrophic forgetting without requiring task identifiers to be acquired during the inference stage by utilizing hidden state sharing modules in a long short term memory structure as discussed below in connection FIGS. 6 and 7. FIG. 6 is a flowchart of a method for processing data using an LSTM structure. FIG. 7 is a flowchart of a method for preventing catastrophic forgetting by the LSTM structure utilizing hidden state sharing modules.

As stated above, FIG. 6 is a flowchart of a method 600 for processing data using LSTM structure 300 (FIG. 3) in accordance with an embodiment of the present disclosure.

Referring to FIG. 6, in conjunction with FIGS. 1-5, in step 601, analyzer 101 receives data 102 to be processed (e.g., classified, used to make predictions). In one embodiment, data 102 includes single data points (e.g., images) or entire sequences of data (sequential data) (e.g., speech, video).

In step 602, LSTM engine 201 of analyzer 101 processes the received data 102 by using LSTM structure 300. In one embodiment, data is received to be processed by LSTM engine 201 to engage in continual learning. "Processing" of data 102 by LSTM engine 201, as used herein, refers to classifying, converting, manipulating and managing data 102 as well as making predictions using the received data 102. For example, such data 102 may be classified or used to make predictions by analyzer 101 using LSTM structure 300, such as solving prediction problems (e.g., predicting sales, finding patterns in stock markets' data, understanding movie plots, recognizing a person's way of speech, language translations, predicting a person's next word on a keyboard, etc.). Such outputted data 103 may then be presented to a user, such as via a user interface of analyzer 101. In one embodiment, LSTM structure 300 includes hidden state sharing modules (broadcast modules 302, collect modules 304) for allowing information sharing in hidden states across different tasks.

A description of LSTM structure 300 processing data 102 is discussed below in connection with FIG. 7.

FIG. 7 is a flowchart of a method 700 for preventing catastrophic forgetting by LSTM structure 300 utilizing hidden state sharing modules in accordance with an embodiment of the present disclosure.

Referring to FIG. 7, in conjunction with FIGS. 1-6, in step 701, LSTM engine 201 of analyzer 101 receives and processes a data set of a first task (e.g., $k_1$). Such a data set is included in the received data 102 of step 601 to be processed by LSTM engine 201 in step 602.

In step 702, LSTM engine 201 of analyzer 101 updates the model parameters (e.g., $\{W_1, b_1\}$) of the task-oriented module 301 (e.g., $M_1$ 301A) for the first task (e.g., $k_1$) using the data set of the first task in response to processing the data set of the first task by LSTM engine 201. For example, as discussed above, $M_1$ is updated like a standard LSTM with the training data $x \in X_1$:

$$h^{(t)} = M_1(x^{(t)}, h^{(t-1)}), t \in \{1, 2, \ldots, T\} \quad (9)$$

In step 703, LSTM engine 201 of analyzer 101 receives and processes a data set of the next task (e.g., $k_2$). Such a data set is included in the received data 102 of step 601 to be processed by LSTM engine 201 in step 602.

In step 704, LSTM engine 201 of analyzer 101 freezes or immobilizes changes to the model parameters (e.g., $\{W, b\}$) of the modules for pre-existing tasks in response to processing the data set of the next task. For example, referring to FIG. 3, if k=2, then the model parameters of module 301A is frozen. If k=3, then the model parameters of modules 301A, 301B, 302A and 304A are frozen and so forth.

In step 705, task-oriented module creator 202 of analyzer 101 creates a task-oriented module 301 for the next task (e.g., $k_1$) in response to processing the data set of the next task. For example, referring to FIG. 3, if k=2, then task-oriented module creator 202 creates task-oriented module 301B to control informational flow. As discussed above, task-oriented modules 301 include computational blocks that control information flow.

In step 706, broadcast module creator 203 of analyzer 101 create a broadcast module 302 (e.g., module 302A) for the next task (e.g., k=2) in order to send the hidden states of the next task (e.g., k=2) to all the previous modules in response to processing the data set of the next task. For example, referring to FIG. 3, if k=2, then broadcast module creator 203 creates broadcast module 302A which sends the hidden states of the task to all the previous modules, such as module 301A. If k=3, then broadcast module creator 203 creates broadcast module 302B which sends the hidden states of the task to all of the previous modules, such as modules 301A, 301B, 302A and 304A.

In step 707, collect module creator 204 of analyzer 101 creates a collect module 304 (e.g., collect module 304A) for the next task (e.g., k=2) to collect all the hidden states from all the previous modules in response to processing the data set of the next task. For example, referring to FIG. 3, if k=2, then collect module creator 204 creates collect module 304A which collects all the hidden states from all of the previous modules, such as module 301A. If k=3, then collect module creator 204 creates collect module 304B which collects all the hidden states from all the previous modules, such as modules 301A, 301B, 302A and 304A.

In this manner, by broadcasting the hidden states to all the previous modules as well as collecting the hidden states from all the previous modules, information learned from old tasks are not forgotten as the artificial neural network attempts to learn new tasks. That is, catastrophic forgetting is avoided by preventing the loss of previously learned information via the use of hidden state sharing modules. Furthermore, by using such hidden state sharing modules, the requirement of acquiring a task identifier during the inference stage is avoided.

In step 708, a determination is made by LSTM engine 201 of analyzer 101 as to whether there are any further tasks from the received data (received in step 601) that need to be processed. If there are further tasks that need to be processed, then LSTM engine 201 of analyzer 101 receives and processes a data set of the next task (e.g., $k_3$) in step 703.

If, however, there are no further tasks that need to be processed, then, in step 709, LSTM engine 201 of analyzer 101 obtains an output hidden state of LSTM structure 300 by summing the hidden states of all the modules of LSTM structure 300. For example, as discussed above, the output hidden state $h_{out_k}^{(t)}$ is obtained by:

$$h_{out_k}^{(t)} h_1^{(t)} + h_2^{(t)} + \ldots + h_k^{(t)}.$$

As a result of the foregoing, the embodiments of the present disclosure provide a means for preventing catastrophic forgetting without requiring task identifiers to be acquired during the inference stage by utilizing hidden state sharing modules in a long short term memory structure, such as a long short term memory structure engaged in continual learning. In one embodiment, the hidden state sharing modules include a broadcast module to send its hidden states to all of the old tasks and a collect module to collect hidden states as inputs from all of the old tasks. Therefore, the output gate of each task integrates information from all the tasks.

Furthermore, the principles of the present disclosure improve the technology or technical field involving artificial neural networks. As discussed above, there are various types of artificial neural networks, such as modular neural networks, radial basis function neural networks, Kohonen neural networks, recurrent neural networks, convolutional neural networks, long short term memory networks, etc. Such artificial neural networks, such as long short term memory networks, are used to process single data points (e.g., images), including entire sequences of data, such as speech or video. For example, long short term networks are applicable to tasks, such as unsegmented, connected handwriting recognition, speech recognition, and anomaly detection in network traffic or intrusion detection systems. Unfortunately, when such artificial neural networks attempts to learn new tasks, old tasks may be forgotten. Such a phenomenon is known as "catastrophic forgetting." Catastrophic forgetting is the tendency of the artificial neural network to completely and abruptly forget previously learned information upon learning new information. Specifically, these problems refer to the challenge of making an artificial neural network that is sensitive to, but not disrupted by, new information. Attempts have bene made to address catastrophic forgetting, such as using expendable networks to store and learn old and new knowledge and then acquire a task identifier to select one from all the tasks during the "inference stage" (stage in which the model is used to infer or predict). Unfortunately, the requirement of acquiring a task identifier during the inference stage is infeasible and impractical in real-world scenarios due to time constraints and the number of task identifiers that need to be generated.

Embodiments of the present disclosure improve such technology by receiving data, including single data points (e.g., images) or entire sequences of data (e.g., speech, video), to be processed (e.g., classified, used to make predictions, etc.). A long short term memory structure is utilized to process the received data, where the long short term memory structure includes hidden state sharing modules for allowing information sharing in hidden states across different tasks. In one embodiment, the hidden state sharing modules include broadcast modules which are configured to send hidden states of the current task to all previous modules and collect modules which are configured to collect all the hidden states from all the previous modules. In this manner, by broadcasting the hidden states to all the previous modules as well as collecting the hidden states from all the previous modules, information learned from old tasks are not forgotten as the artificial neural network attempts to learn new tasks. That is, catastrophic forgetting is avoided by preventing the loss of previously learned information via the use of hidden state sharing modules. Furthermore, by using such hidden state sharing modules, the requirement of acquiring a task identifier during the inference stage is avoided. Furthermore, in this manner, there is an improvement in the technical field involving artificial neural networks.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for preventing catastrophic forgetting, the method comprising:
   receiving data; and
   processing said received data by utilizing a long short term memory structure, wherein said long short term memory structure comprises hidden state sharing modules for allowing information sharing in hidden states across different tasks, wherein said hidden state sharing modules broadcast hidden states to all previous modules and collect hidden states from all said previous modules thereby preventing a loss of previously learned information so as to avoid catastrophic forgetting.

2. The method as recited in claim 1, wherein said hidden state sharing modules comprise a first module configured to send hidden states of a task to all said previous modules.

3. The method as recited in claim 1, wherein said hidden state sharing modules comprise a second module configured to collect all hidden states from all said previous modules.

4. The method as recited in claim 1, wherein said data comprises a data set for a first task, wherein the method further comprises:
   updating model parameters of a first task-oriented module with said data set for said first task in response to processing said data set for said first task, wherein said model parameters of said first task-oriented module comprise a matrix and a bias, wherein said first task-oriented module comprises computational blocks that control information flow.

5. The method as recited in claim 4, wherein said data comprises a data set for a second task which is subsequent to said first task, wherein the method further comprises:
   immobilizing changes to said model parameters of said first task-oriented module in response to processing said second task; and
   creating a second task-oriented module for said second task in response to processing said second task, wherein said second task-oriented module comprises computational blocks that control information flow.

6. The method as recited in claim 5 further comprising:
   creating a first hidden state sharing module of said hidden state sharing modules configured to send hidden states of said second task to all said previous modules in response to processing said second task; and creating a second hidden state sharing module of said hidden state sharing modules configured to collect all hidden states from all said previous modules in response to processing said second task.

7. The method as recited in claim 1 further comprising:
obtaining an output hidden state of said long short term memory structure by summing hidden states of all modules of said long short term memory structure.

8. A computer program product for preventing catastrophic forgetting, the computer program product comprising one or more computer readable storage mediums having program code embodied therewith, the program code comprising programming instructions for:
receiving data; and
processing said received data by utilizing a long short term memory structure, wherein said long short term memory structure comprises hidden state sharing modules for allowing information sharing in hidden states across different tasks, wherein said hidden state sharing modules broadcast hidden states to all previous modules and collect hidden states from all said previous modules thereby preventing a loss of previously learned information so as to avoid catastrophic forgetting.

9. The computer program product as recited in claim 8, wherein said hidden state sharing modules comprise a first module configured to send hidden states of a task to all said previous modules.

10. The computer program product as recited in claim 8, wherein said hidden state sharing modules comprise a second module configured to collect all hidden states from all said previous modules.

11. The computer program product as recited in claim 8, wherein said data comprises a data set for a first task, wherein the program code further comprises the programming instructions for:
updating model parameters of a first task-oriented module with said data set for said first task in response to classifying, processing or making predictions using said data set for said first task, wherein said model parameters of said first task-oriented module comprise a matrix and a bias, wherein said first task-oriented module comprises computational blocks that control information flow.

12. The computer program product as recited in claim 11, wherein said data comprises a data set for a second task which is subsequent to said first task, wherein the program code further comprises the programming instructions for:
immobilizing changes to said model parameters of said first task-oriented module in response to processing said second task; and
creating a second task-oriented module for said second task in response to processing said second task, wherein said second task-oriented module comprises computational blocks that control information flow.

13. The computer program product as recited in claim 12, wherein the program code further comprises the programming instructions for:
creating a first hidden state sharing module of said hidden state sharing modules configured to send hidden states of said second task to all said previous modules in response to processing said second task; and
creating a second hidden state sharing module of said hidden state sharing modules configured to collect all hidden states from all said previous modules in response to processing said second task.

14. The computer program product as recited in claim 8, wherein the program code further comprises the programming instructions for:
obtaining an output hidden state of said long short term memory structure by summing hidden states of all modules of said long short term memory structure.

15. A system, comprising:
a memory for storing a computer program for preventing catastrophic forgetting; and
a processor connected to said memory, wherein said processor is configured to execute program instructions of the computer program comprising:
receiving data; and
processing said received data by utilizing a long short term memory structure, wherein said long short term memory structure comprises hidden state sharing modules for allowing information sharing in hidden states across different tasks, wherein said hidden state sharing modules broadcast hidden states to all previous modules and collect hidden states from all said previous modules thereby preventing a loss of previously learned information so as to avoid catastrophic forgetting.

16. The system as recited in claim 15, wherein said hidden state sharing modules comprise a first module configured to send hidden states of a task to all said previous modules.

17. The system as recited in claim 15, wherein said hidden state sharing modules comprise a second module configured to collect all hidden states from all said previous modules.

18. The system as recited in claim 15, wherein said data comprises a data set for a first task, wherein the program instructions of the computer program further comprise:
updating model parameters of a first task-oriented module with said data set for said first task in response to classifying, processing or making predictions using said data set for said first task, wherein said model parameters of said first task-oriented module comprise a matrix and a bias, wherein said first task-oriented module comprises computational blocks that control information flow.

19. The system as recited in claim 18, wherein said data comprises a data set for a second task which is subsequent to said first task, wherein the program instructions of the computer program further comprise:
immobilizing changes to said model parameters of said first task-oriented module in response to processing said second task; and
creating a second task-oriented module for said second task in response to processing said second task, wherein said second task-oriented module comprises computational blocks that control information flow.

20. The system as recited in claim 19, wherein the program instructions of the computer program further comprise:
creating a first hidden state sharing module of said hidden state sharing modules configured to send hidden states of said second task to all said previous modules in response to processing said second task; and
creating a second hidden state sharing module of said hidden state sharing modules configured to collect all hidden states from all said previous modules in response to processing said second task.

* * * * *